United States Patent [19]
Sage et al.

[11] Patent Number: 6,010,641
[45] Date of Patent: Jan. 4, 2000

[54] LIQUID CRYSTAL POLYMER DEVICES AND MATERIALS

[75] Inventors: Ian C Sage; Keith M Blackwood, both of Malvern; Mark A Verrall, Poole; David Coates, Poole; David R Beattie, Poole, all of United Kingdom

[73] Assignee: The Secretary of State for Defence in her Britannic Majesty's Government of the United Kingdom of Great Britain and Northern Ireland, United Kingdom

[21] Appl. No.: 09/000,058

[22] PCT Filed: Jul. 19, 1996

[86] PCT No.: PCT/GB96/01743

§ 371 Date: Jan. 20, 1998

§ 102(e) Date: Jan. 20, 1998

[87] PCT Pub. No.: WO97/04349

PCT Pub. Date: Feb. 6, 1997

[30] Foreign Application Priority Data

Jul. 21, 1995 [GB] United Kingdom .................. 9514970

[51] Int. Cl.[7] .......................... C09K 19/38; G02F 1/133; C08G 67/02; C08G 65/02

[52] U.S. Cl. .................. 252/299.01; 252/299.61; 252/299.63; 252/299.64; 252/299.65; 252/299.66; 349/183; 428/64.4; 528/105; 528/392; 528/401

[58] Field of Search .................... 252/299.01, 299.64, 252/299.65, 299.66, 299.67; 428/64.4; 528/392, 401, 105; 349/183

[56] References Cited

U.S. PATENT DOCUMENTS

| 5,518,652 | 5/1996 | Parri et al. | 252/299.01 |
| 5,607,620 | 3/1997 | Verrall et al. | 252/299.67 |
| 5,676,878 | 10/1997 | Lacey et al. | 252/299.01 |
| 5,720,900 | 2/1998 | Parri et al. | 252/299.66 |
| 5,750,051 | 5/1998 | Goulding et al. | 252/299.65 |
| 5,769,393 | 6/1998 | Kobayashi et al. | 252/299.01 |

*Primary Examiner*—Shean C. Wu
*Attorney, Agent, or Firm*—Nixon & Vanderhye

[57] ABSTRACT

Methods for loading and alignment of liquid crystal polymers in electro-optic and electro-active devices comprise in-situ polymerisation between substrates of monomer material in the presence of a cationic initiator. This allows for the synthesis of liquid crystal polymers containing polyether backbones.

9 Claims, 4 Drawing Sheets

LIQUID CRYSTAL POLYMER DEVICES AND MATERIALS

This invention relates to the alignment of liquid crystal polymers in liquid crystal devices and the provision of novel liquid crystal polymers.

The unit that is the basic building block of a polymer is called a monomer.

The polymerisation process i.e. the formation of a polymer from its constituent monomers does not usually create polymers of uniform molecular weight, rather what is created is a distribution of molecular weights. In order to describe a sample of polymer it is necessary to state the average number of monomers in a polymer this is called the degree of polymerisation (D.P). By how much the majority of polymer molecules differ from this average value (or to describe the spread of molecular weight) is called the polydispersity.

A number of different average molecular weights can be drawn from gel permeation chromatography (GPC) for a given sample including: Mn—number average molecular weight and Mw—weight average molecular weight. The value used to calculate D.P. is usually Mn and polydispersity is usually defined as Mw/Mn.

Polymers can be made from different types of monomers, in which case the polymer is called a co-polymer. If two types of monomer join in a random fashion then the polymer is called a random co-polymer. If the two monomers form short sequences of one type first which then combine to form the final polymer then a block copolymer results. If short sequences of one of the monomers attach themselves as side chains to long sequences consisting of the other type of monomer then the polymer is referred to as a graft copolymer.

In liquid crystal polymers the monomers can be attached together in essentially two ways. The liquid crystal part or mesogenic unit of the polymer may be part of the polymer backbone resulting in a main chain polymer, alternatively the mesogenic unit may be attached to the polymer backbone as a pendant group i.e. extending away from the polymer backbone; this results in a side-chain polymer. These different types of polymer liquid crystal are represented schematically below. The mesogenic units are depicted by the rectangles.

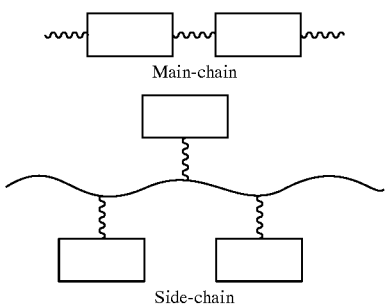

The side chain liquid crystal polymer can generally be thought of as containing a flexible polymer with rigid segments (the mesogenic unit) attached along its length by short flexible (or rigid) units as depicted in the schematic representation below. It is the anisotropic, rigid section of the mesogzenic units that display orientational order in the liquid crystal phases. In order to affect the phases exhibited by the liquid crystal and the subsequent optical properties there are many features which can be altered, some of these features are particularly pertinent to side-chain liquid crystal polymers. One of these features is the flexible part that joins the mesogenic unit to the polymer backbone which is generally referred to as a spacer, the length of this spacer can be altered, its flexibility can also be altered.

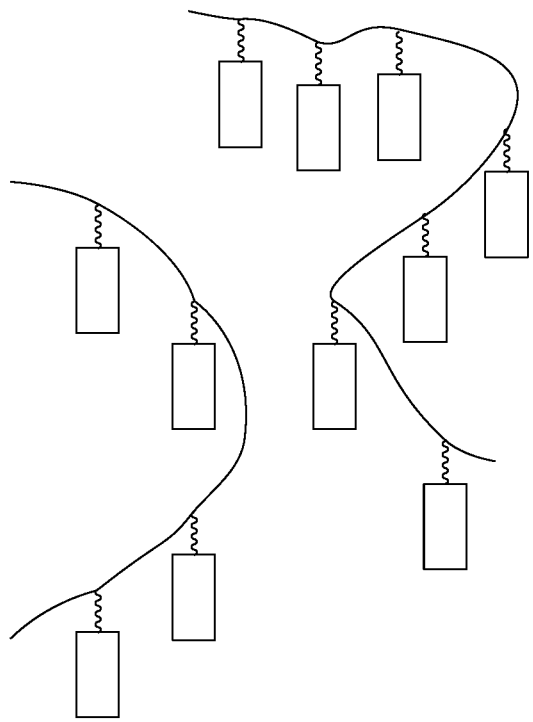

A number of side-chain liquid crystal polymers are known, for example see GB 2146787 A.

Liquid crystal polyacrylates are a known class of liquid crystal polymer (LCP). LCPs are known and used in electro-optic applications, for example in pyroelectric devices. non-linear optical devices and optical storage devices. For example see GB 2146787 and Makromol. Chem. (1985) 186 2639–47.

Side-chain liquid crystal polyacrylates are described in Polymer Communications (1988), 24, 364–365 e.g. of formula:

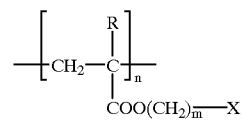

where $(CH_2)_m$—X is the side-chain mesogenic unit and R is hydrogen or alkyl.

Side-chain liquid crystal polychloroacrylates are described in Makromol. Chem. Rapid Commun. (1984), 5,393–398 e.g. of formula:

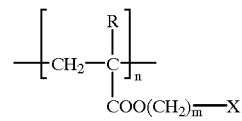

where R is chlorine.

A method for the preparation of polyacrylate homo- or co-polymers having the following repeat unit is described in UK patent application GB 9203730.8

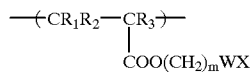

R$_1$ and R$_2$ are independently alkyl or hydrogen, R$_3$ is alkyl, hydrogen or chlorine, m is O or an integer 1–20, W is a linkage group COO or OOC or O and X is a mesogenic group.

One of the main problems with polymer liquid crystals is that the, are extremely difficult to align in devices. Essentially there are two techniques which have been used for aligning polymer liquid crystals. It is possible to try to align the liquid crystal polymer in a similar manner as a low molar mass liquid crystal, which is described in more detail below. Alternatively, mechanical techniques can be used such as shearing. Typically mechanical shearing is performed over hot rollers, this technique is generally only suitable for flexible substrates. It is possible to shear a sample between glass slides however the glass slides cannot be sealed in the conventional manner.

Materials and Assembling Process of LCDs by Morozumi in Liquid Crystals Applications and uses, vol 1 Ed. Bahadur, World Scientific Publishing Co. Ptc. Ltd. 1990 pp 171–194 and references therein as the title suggests discusses methods for assembling liquid crystal devices.

The technique for aligning low molar mass liquid crystals is typically as follows. Transparent electrodes are fabricated on the surfaces of the substrates, the substrates typically being made of glass e.g. glass slides. In twisted nematic or super twisted nematic devices, for example, an alignment process is necessary for both substrates. A thin alignment layer is deposited to align the liquid crystal molecules, typically either organic or inorganic aligning layers are used, for example SiO deposited by evaporation is a typical inorganic alignment layer. One method to form the alignment layer involves rubbing the surface by textures or cloths. Polyimides have also been employed for the surface alignment of layers. Polymide is coated onto the substrates bearing electrodes by a spinner and then cured to form a layer of approximately 50 nm thickness. Then each layer surface is repeatedly rubbed in substantially one direction with an appropriate material. If the liquid crystal molecules are deposited on this layer they are automatically aligned in the direction made by the rubbing. It is often preferable if the molecules possess a small angle pre-tilt typically 2–3°. Higher pre-tilts are sometimes required.

The two substrates are then fixed together for example by adhesive and are kept separate by spacing materials. This results in uniform and accurate cell spacing. A typical adhesive is an epoxy resin. This sealing material is usually then precured. The electrodes may then be precisely aligned for example to form display pixels. The cell is then cured at, for example 100–150° C. At this point the empty liquid crystal cell is complete.

It is at this point that the cell is filled with liquid crystal material. The opening size in the sealing area of the liquid crystal cell is rather small therefore the cell can be evacuated, for example in a vacuum chamber, and the liquid crystal forced into the cell via gas pressure. More than one hole in the sealing area may be used. The empty cell is put into a vacuum chamber and then the vacuum chamber is pumped down. After the cell has been evacuated the open region of the sealant is dipped into the liquid crystal material and the vacuum chamber is brought back to normal pressure. Liquid crystal material is drawn into the cell as a result of capillary action, external gases can be applied to increase the pressure. When the filling process is complete the hole or holes in the sealant is/are capped and the cell is cured at a temperature above the liquid crystal material clearing point to make the liquid crystal molecular alignment stable and harden the capping material.

Polymer liquid crystal molecules tend to be more viscous than low molecular weight liquid crystal materials and are therefore more difficult to align and more difficult to fill into devices. Only liquid crystal polymers with low molecular weights can be flow filled into a cell, and once a degree of polymerisation greater than around 30 or 40 repeat units is reached, most liquid crystal polymers become so viscous that flow filling cells is extremely difficult. Much slower cooling is needed in order to try and align liquid crystal polymers and this usually results in poor uniformity of alignment.

Poorly aligned liquid crystal molecules do not result in the fast switching high contrast materials and devices that are generally required.

The above techniques are suitable for many liquid crystal materials including those devices which use liquid crystal materials which exhibit and utilise the smectic mesophase e.g. ferroelectrics. Suitable alignment techniques may also be found in GB 2210469 B.

Devices containing ferroelectric liquid crystal mixtures can exhibit fist switching times (faster than 100 $\mu$s), Clark and Lagerwall, Appl. Phys. Lett., 36, 89, 1980. They can be bistable which means that they can be multiplexed at high levels using a line-at-a-time scan technique. Ferroelectric materials continue to receive a large amount of investigative attention due to their application in high resolution flat panel displays. An important feature of devices containing liquid crystalline materials is that they should exhibit a fast response time. The response time is dependent on a number of factors, one of these being the spontaneous polarisation, denoted Ps (measured in nC cm$^{-2}$). By adding a chiral dopant to the liquid crystalline mixture the value of Ps can be increased, thus decreasing the response time of the device. Ferroelectric smectic liquid crystal materials, which can be produced by mixing an achiral host and a chiral dopant, use the ferroelectric properties of the tilted chiral smectic C, F, G, H, I, J, and K phases. The chiral smectic C phase is denoted $S_C$* with the asterisk denoting chirality. The $S_C$* phase is generally considered to be the most useful as it is the fastest switching. It is desirable that the material should exhibit a nematic (denoted N) and $S_A$ phase at temperatures above the chiral smectic phase in order to assist surface alignment in a device containing liquid crystalline material. Ferroelectric smectic liquid materials should ideally possess the following characteristics: low viscosity controllable Ps and an $S_C$* phase that persists over a a broad temperature range, which should include ambient temperature, and exhibits chemical and photochemical stability. Materials which possess these characteristics offer the prospect of very fast switching liquid crystal containing devices.

Ferroelectric LCDs by Dijon in Liquid Crystals Applications and Uses, vol 1 Ed. Bahadur, World Scientific Publishing Co. Pte. Ltd, 1990 pp 350–360 and references therein discusses alignment processes for smectic phases for low molar mass materials. The filling of cells is believed to be possible only in the isotropic or nematic phase due to the viscosity of smectic phases. Generally materials with the following phase sequence give good alignment:

I—N*—S$_A$—S$_C$* or I—S$_A$—S$_C$* whereas materials with the following phase sequences are more difficult to align:

I—N*—S$_C$*

Typically, therefore. in order to use a liquid crystal material in the smectic phase it will involve heating the material to the nematic or isotropic phase and allowing it to cool slowly into an aligned smectic state. Should this technique be applied to a polymer liquid crystal material then the cooling time is usually very much longer in order to assist the alignment, though very often the alignment is poor.

This invention solves the above problems by the in-situ polymerisation of liquid crystal monomer material.

According to a first aspect of the invention

A method of making an electro-optic device comprises the steps of:

forming a cell comprising two cell walls spaced apart, the walls inner surfaces having formed thereon electrode structures, providing a mixture comprising a monomer material and a cationic initiator, introducing the mixture between the cell walls, polymerising the mixture.

There may also be present in the mixture a radical initiator.

Preferably at least one wall is surface treated to provide liquid crystal alignment.

The monomer material may be aligned before polymerisation and/or the polymer may be aligned after polymerisation. The monomer may be present in any of the known liquid crystal phases including nematic, cholesteric or smectic.

Preferably the polymerisation is carried out under UV light and/or in the presence of additional heat.

The cell walls may be substantially rigid or at least one of them may be substantially flexible; such a cell may be used to manufacture a thin layer of liquid crystal polymer, eg a smectic liquid crystal polymer. In this method the electrodes are not necessary. An aligned layer of liquid crystal polymer is produced as above. At least one of the substantially flexible cell walls is removed, eg by peeling away from the aligned polymer layer. If required, electrodes can be formed on at least one of the layers; for example the electrodes may be made from Indium Tin Oxide, Aluminium or Gold. Electrodes may also be constructed from conducting polymer or a combination of the above. The electrodes may or may not be transparent. The layer or layer electrodes may be mounted onto one support or between supports. Such a method may be useful in producing pyroelectric piezoelectric and other electro-active devices, for example sensors.

Patent Application GB 9420632.3 describes the use of chain transfer reagents to control molecular weight of liquid crystal polymers. There may also be a chain transfer reagent present in the mixture of the current invention.

According to a further aspect of the invention, material of formula I is provided

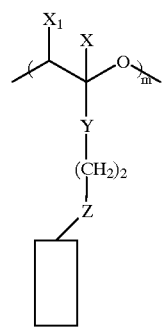

wherein X and X$_1$ are independently selected from straight or branched chain C$_{1-16}$ allyl, halogen and H;

is any suitable mesogenic group;
Z=single covalent bond, oxygen, CO$_2$ or OCO;
n=1–20; Y=O, CO$_2$, OCO, CH$_2$, CHOH;
m=3–10,000;
the mesogenic group is defined from general structure II:

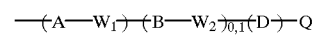

wherein A, B and D are independently selected from:

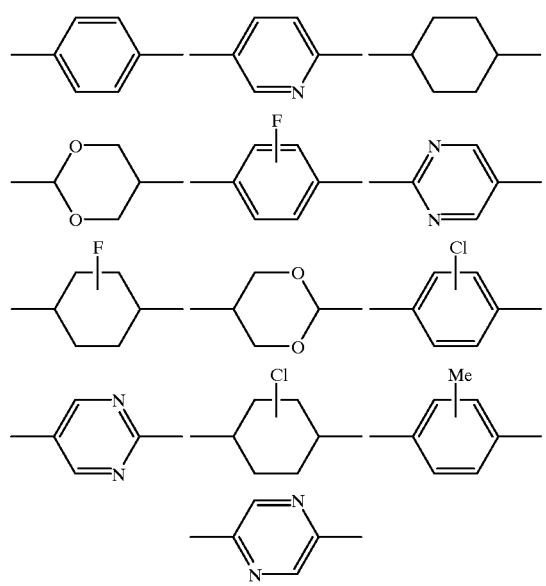

W$_1$ and W$_2$ are independently selected from a single covalent bond. COO, OCO, CH$_2$CH$_2$, CH$_2$O, OCH$_2$, O;
Q is selected from:
  CN, halogen, R, OR, COOR, OOCR, CF$_3$ and lactate derivatives where R may be chiral, straight or branched chain alkyl and may include from 1–16 carbon atoms and including where one or more non-adjacent CH$_2$ groups may be substituted by CH(CN), CH(CF$_3$), CH(Cl), CH(CH$_3$);

the substituents on the phenyl and cyclohexyl rings indicate that at least one substituent may be present on the rings specified and up to four substituents present on the phenyl rings and up to ten substituents present on the cyclohexyl rings.

Liquid crystal polymers described by the current invention may be any of the known types including homo or co polymers.

Y may be CHOH and the OH groups used as a point of attachment for cross-linking agents to form elastomers, examples of such cross-linking agents include:

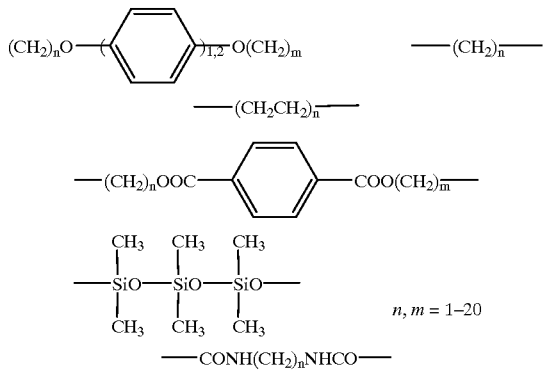

$n, m = 1-20$

According to a further aspect of the invention a method of making an electro-optic device comprising one or more materials of formula I comprises the steps of:

forming a cell comprising two cell walls spaced apart, the walls inner surfaces having formed thereon electrode structures, providing a mixture comprising a monomer material and a cationic initiator, introducing the mixture between the cell walls, polymerising the mixture.

There may also be present in the mixture a radical photoinitiator.

Preferably at least one wall is surface treated to provide liquid crystal alignment.

The monomer material may be aligned before polymerisation and/or the polymer may be aligned after polymerisation. The monomer may be present in any of the known liquid crystal phases including nematic, cholesteric or smectic.

Preferably the polymerisation is carried out under UV light and/or in the presence of additional heat.

BRIEF DESCRIPTION OF THE DRAWING

The invention will now be described with reference to the following diagrams wherein.

DESCRIPTION OF THE PREFERRED EMBODIMENTS

Figure 1:
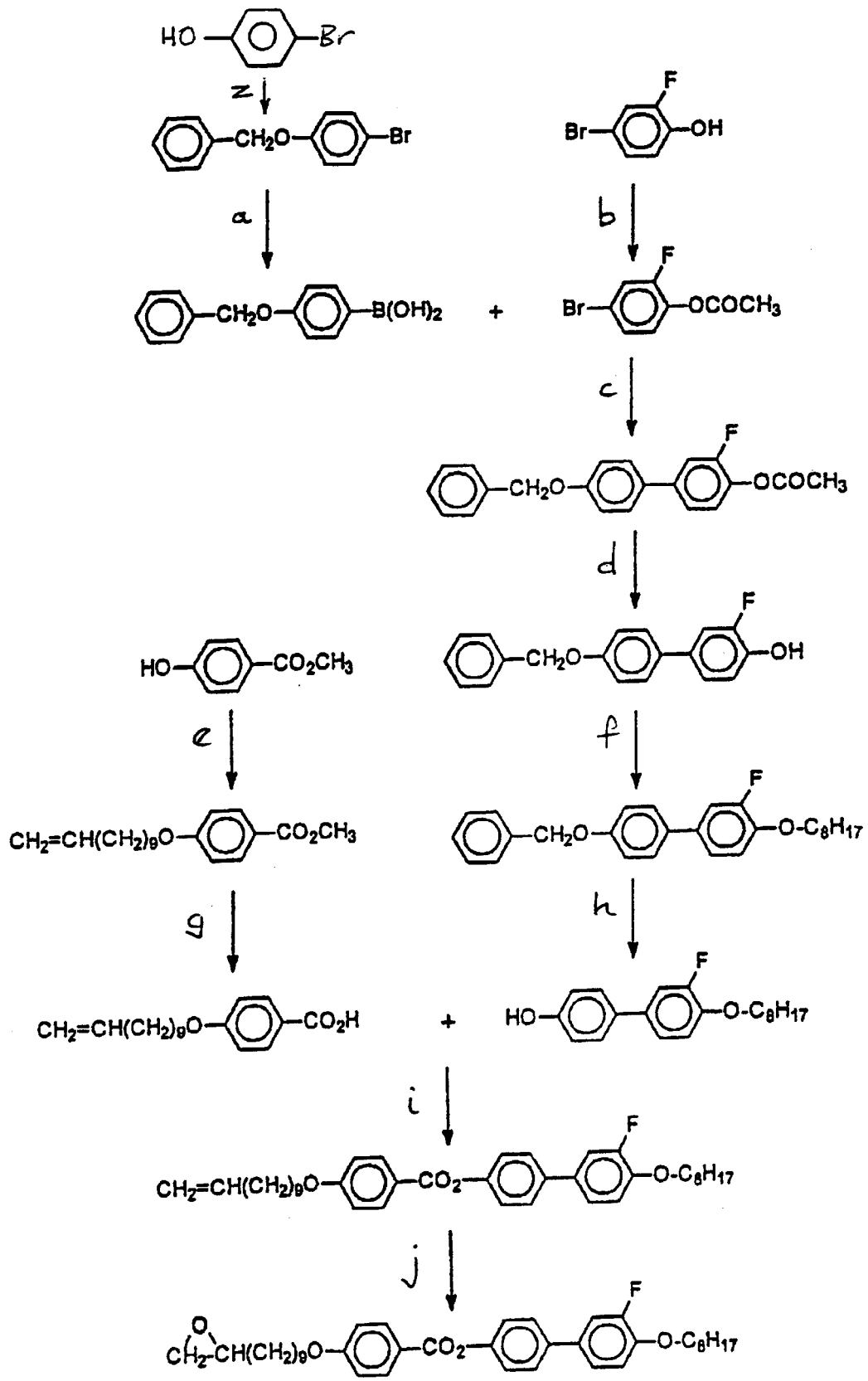
FIG. 1 is a synthetic scheme for the preparation of an epoxide monomer

Scheme 1 refers to FIG. 1.

z/ benzyl chloride, K$_2$CO$_3$, butanone, reflux 24 hr a/ Mg, B(OMe)$_3$, THF, HCl(aq)
b/ (CH$_3$CO)$_2$O, H$_2$O, NaOH, reflux 24 hr
c/ Pd(PPh$_3$)$_4$, K$_3$PO$_4$.H$_2$O, 1,4-dioxane, 80° C., N$_2$(g), 24 hr
d/ KOH, IMS/H$_2$O, reflux 24 hr
e/ CH$_2$=CH(CH$_2$)$_9$Br, K$_2$CO$_3$/butanone, reflux 24 hr
f/ CH$_3$(CH$_2$)$_7$OH, PPh$_3$, DEAD, THF, 25° C., N$_2$(g), 24 hr
g/ KOH, IMS/H$_2$O, reflux, 24 hr
h/ H$_2$(g), THF, Pd/C (5%), 25° C., 24 hr
i/ TFAA, DCM, 25° C., N$_2$(g), 8 hr
j/ m-CPBA, DCM, 0° C., N$_2$(g), 18 hr wherein, DCM=dichloromethane, DEAD=diethyl azodicarboxylate, IMS=industrial methylatedspirit, m-CPBA=meta-chloroperbenzoic acid. TFAA=trifluoroacetic anhydride, THF=tetrahydrofuran.

4-bromophenol was purchased from Aldrich, 2-fluoro,4-bromo-phenol was purchased from Wychem UK. All other starting materials were purchased from Aldrich.

Figure 3:
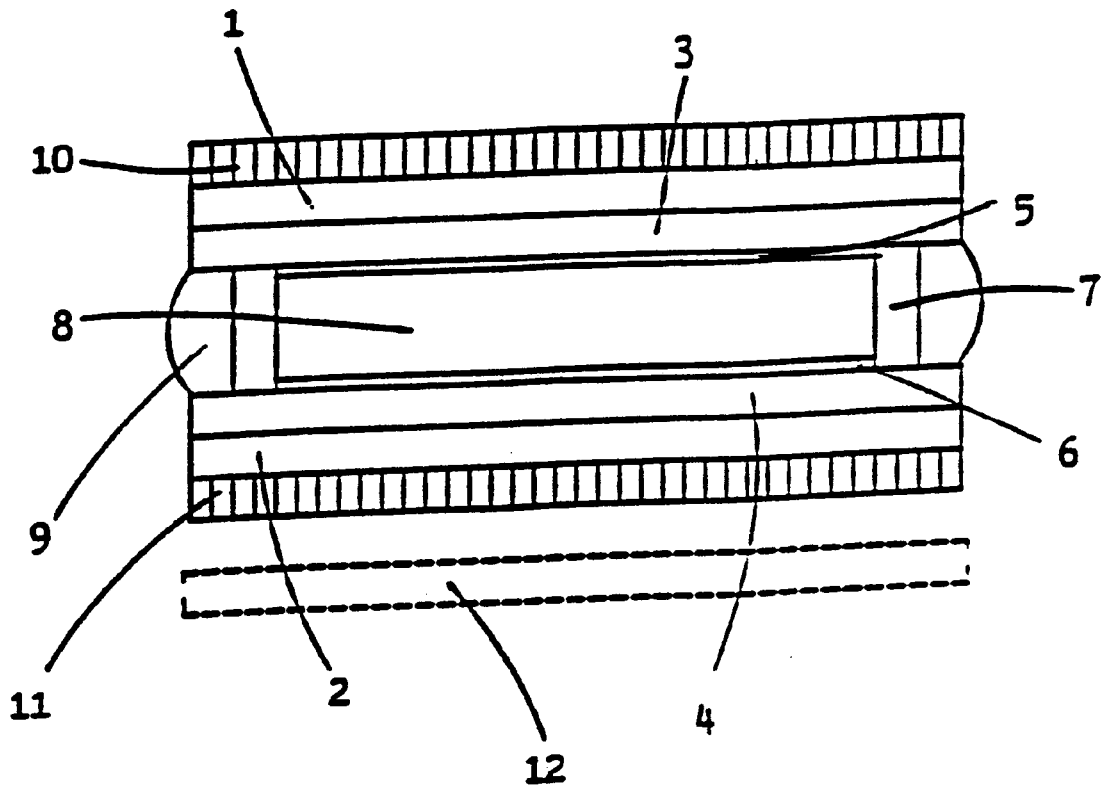
FIG. 3 illustrates a liquid crystal device

An example of the use of a material and device embodying the present invention will now be described with reference to FIG. 3.

The liquid crystal device consists of two transparent plates, 1 and 2, for example made from glass. These plates are coated on their internal face with transparent conducting electrodes 3 and 4. An alignment layer is introduced onto the internal faces of the cell so that a planar orientation of the molecules making up the liquid crystalline material will be approximately parallel to the glass plates 1 and 2. This is done by coating the Lass plates 1,2 complete with conducting electrodes so that the intersections between each column and row form an x, y matrix of addressable elements or pixels. Prior to the construction of the cell the films 5,6 are rubbed with a roller covered in cloth (for example made from velvet) in a given direction, the rubbing directions being arranged parallel (same or opposite direction) upon construction of the cell. A spacer 7 eg of polymethyl methacrylate separates the glass plates 1 and 2 to a suitable distance eg 2 microns. Liquid crystal material 8 is introduced between glass plates 1,2 by filling the space in between them. This may be done by flow filling the cell using standard techniques. The spacer 7 is sealed with an adhesive 9 in a vacuum using an existing technique. Polarisers 10, 11 may be arranged in front of and behind the cell.

Alignment layers may be introduced onto one or more of the cell walls by one or more of the standard surface treatment techniques such as rubbing, oblique evaporation or as described above by the use of polymer aligning layers.

The device may operate in a transmissive or reflective mode. In the former, light passing through the device, eg from a tungsten bulb, is selectively transmitted or blocked to form the desired display. In the reflective mode a mirror, or diffuse reflector, (12) is placed behind the second polariser 11 to reflect ambient light back through the cell and two polarisers. By making the mirror partly reflecting the device may be operated both in a transmissive and reflective mode.

In an alternative embodiment a single polariser and dye material may be combined.

The liquid crystal material 8 when introduced into the cell consists of liquid crystal monomers and a cationic initiator. It may also contain a reagent which will limit the molecular weight of the polymer for example a chain transfer reagent and it may also include a radical photoinitiator and/or thermal initiator.

The monomer material may be aligned before polymerisation using standard techniques, for example by heating up to and cooling from the isotropic phase or from a liquid crystal phase such as a nematic or chiral nematic phase. It is also possible that the liquid crystal polymer may be aligned by one or more techniques including the use of surface forces, shear alignment or field alignment.

It is possible that following polymerisation there may still be some amount of monomer material remaining. This may be unreacted monomer or low molar mass additives which do not bear polymerisable groups.

Polymerisation may be carried out by using any of the known techniques. For example the monomer material plus cationic initiator may also contain a photoinitiator and be exposed to UV light, heat may also be applied to permit polymerisation within a given phase of the monomer and/or polymer.

Alternatively the polymerisation process may take place in the presence of heat and a thermal initiator. However if this technique is used it is preferable if it is carried out at a temperature which corresponds to a liquid crystal phase of the monomer material.

Figure 2:
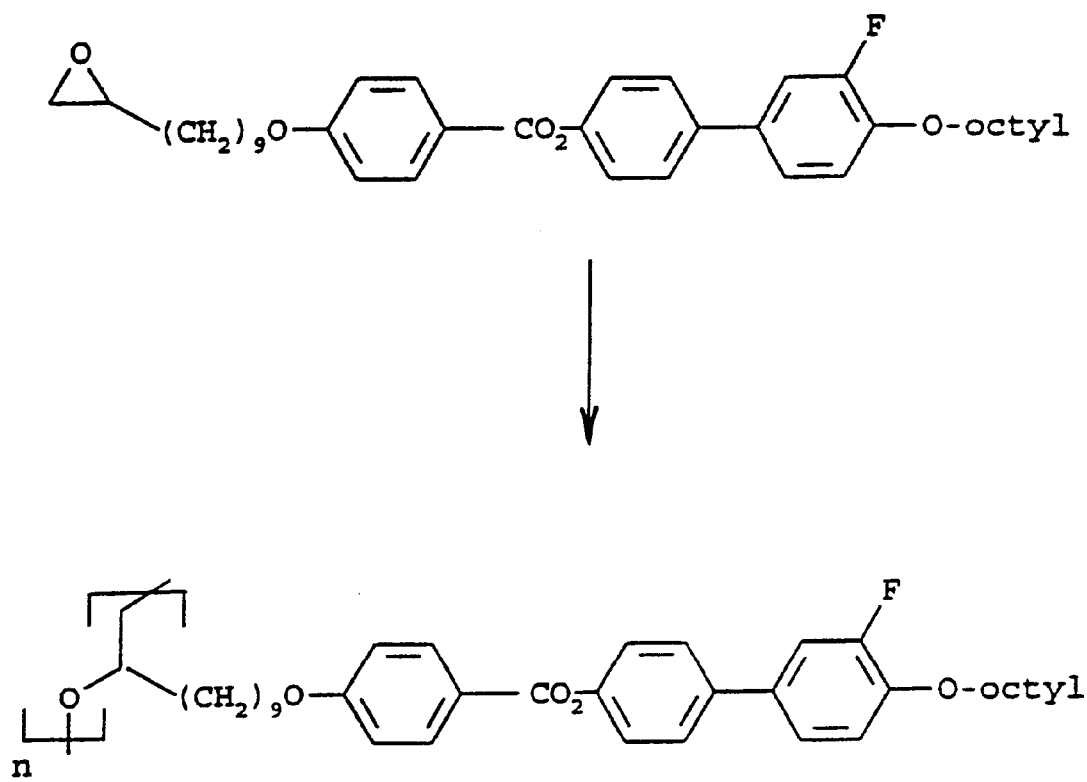
FIG. 2 illustrates the polymerisation of an epoxide monomer

In order to polymerise the epoxide (see FIG. 2), several mixtures were prepared. These mixtures consisted of the epoxide monomer illustrated below (referred to as RM 255), a radical photoinitiator Irgacure 651 (available from Ciba Geigy) and a cationic photoinitiator. The concentration of cationic initiator was varied. The cationic initiator used was Cyracure UVI-6974 (available from Union Carbide).

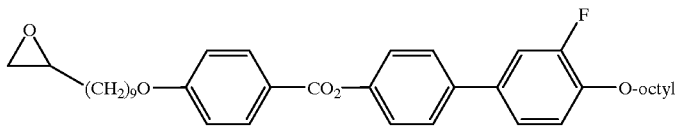

Transition temps/°C.

K 67.5 S 144.4 N 153.6 I

The mixtures were prepared in a brown glass sample tube and care was taken to avoid excess sunlight. The total weight of the mixtures was approximately 100 mg. The radical photoinitiator Irgacure 651 was weighed in to the sample tube and the calculated weight of photoinitiator was added. The mixture was then made up to the total weight with the epoxide monomer. The mixture was then dissolved in a few drops of dichloromethane, mixed well and evaporated to dryness at room temperature under a stream of dry nitrogen. The mixtures were then ready to be polymerised.

Polymerisations were carried out on thin samples e.g. the monomer mixture between glass microscope slides. The monomer mixture in the sample tube was melted gently into the isotropic phase with a hot air blower, a small sample was removed on a glass rod and placed on a preheated glass slide on a hotplate at a temperature a little above the clearing point of the monomer (~160° C.). A second glass slide was then placed on top and gently pressed to give a thin film of monomer mixture. The samples were then removed from the hotplate and were ready for polymerisation.

The prepared samples were placed on a hot plate at the desired temperature, covered with thick card and allowed to come to equilibrium (~5 mins). Meanwhile the desired UV lamp above the hotplate was turned on and also allowed to warm to a constant state. The card was removed for the exposure time and then replaced. The lamp was then turned off and the polymerised samples removed from the hotplate.

The polymers were all examined by GPC to determine the extent of polymerisation. The method for this was as follows:

The glass slides containing the polymers were warmed to allow the two slides to be separated. The slides were then washed with THF to remove all polymer and monomer. The THF solutions were then examined by GPC. The relative areas of the polymer and monomer peaks were used to determine the extent of polymerisation.

The following mixture was investigated:

RM255 98.5%

Irgacure 651 0.5%

Cyracure UVI 6974 1.0%.

The following results were obtained at varying exposure times with a Dr Hönle lamp (~50m W/cm$^2$) at a temperature of 110° C.

| Time/min | % polymer |
|---|---|
| 5 | 74.4 |
| 10 | 63.7 |
| 20 | 74.4 |
| 30 | 68.4 |
| 80 | 84.5 |

Different curing temperatures were investigated for the following system:

RM255 97.3%

Irgacure 651 0.8%

Cyracure UVI-6974 1.8%

| Temp/° C. | time/mins | % polymer |
|---|---|---|
| 89 | 5 | 63 |
| 99 | 5 | 82 |
| 111 | 5 | 80 |
| 125 | 5 | 77 |
| 136 | 5 | 75 |
| 143 | 5 | 78 |
| 154 | 5 | 60 |
| 166 | 5 | <59 |
| 180 | 5 | ~50 |

Different exposure times were investigated for the following system:

RM255 98.5%

Irgacure 651 0.5%

Cyracure UVI-6974 1.0%

| Temp/° C. | Time/mins | % polymer |
|---|---|---|
| 110 | 5 | 74.4 |
| 110 | 10 | 63.7 |
| 110 | 20 | 74.4 |
| 110 | 30 | 68.4 |
| 110 | 80 | 84.5 |

Different exposure times were investigated for the following system:

RM255 97.3%

Irgacure 651 0.8%

Cyracure UVI-6974 1.8%

| temp/° C. | time/mins | % polymer |
|---|---|---|
| 110 | 0.5 | <50 |
| 110 | 1 | 62.5 |
| 110 | 2 | 65.2 |
| 110 | 5 | 78.0 |
| 110 | 10 | 80.4 |
| 110 | 15 | 74.8 |
| 110 | 20 | 86.0 |
| 110 | 30 | 82.7 |
| 110 | 60 | 83.0 |
| 110 | 120 | 81.8 |

Different exposure times were investigated for the following system:
RM255 90.8%
Irgacure 651 2.8%
Cyracure UVI-6974 6.4%

| temp/° C. | time/mins | % polymer |
|---|---|---|
| 110 | 0.5 | 75.8 |
| 110 | 1 | 77.2 |
| 110 | 2 | 75.6 |
| 110 | 5 | 80.1 |
| 110 | 10 | 79.3 |
| 110 | 15 | 81.0 |
| 110 | 20 | 78.6 |
| 110 | 30 | 80.7 |
| 110 | 60 | 79.9 |

Materials have been proposed for laser addressed applications in which laser beams are used to scan across the surface of the material or leave a written impression thereon. For various reasons many of these materials have consisted of organic materials which are at least partially transparent in the visible region. The technique relies upon localised absorption of laser energy which causes localised heating and in turn alters the optical properties of the otherwise transparent material in the region of contact with the laser beam. Thus as the beam traverses the material, a written impression of its path is left behind. One of the most important of these applications is in laser addressed optical storage devices, and in laser addressed protection displays in which light is directed through a cell containing the material and is projected onto a screen. Such devices have been described by Khan Appl. Phys. Lett. vol. 22, p111, 1973: and by Harold and Steele in Proceedings of Euro display 84, pages 29–31, September 1984. Paris. France, in which the material in the device was a smectic liquid crystal material. Devices which use a liquid crystal material as the optical storage medium are an important class of such devices. The use of semiconductor lasers. especially $Ga_xAl_{1-x}$. As lasers where x is from 0 to 1, and is preferably 1, has proven popular in the above applications because they can provide laser energy at a range of wavelengths in the near infra-red which cannot be seen and thus cannot interfere with the visual display, and yet can provide a useful source of well-defamed, intense heat energy. Gallium arsenide lasers provide laser light at wavelengths of about 850 nm, and are useful for the above applications. With increasing Al content (x<1), the laser wavelength may be reduced down to about 750 nm. The storage density can be increased by using a laser of shorter wavelength.

The compounds of the present invention may be suitable as optical storage media and may be combined with dyes for use in laser addressed systems. for example in optical recording media.

The smectic and/or nematic properties of the materials described by the current invention may be exploited. For example the materials of the present invention nay be used in ferroelectric mixtures and devices.

The compounds of the present invention may also be used in pyroelectric devices for example detectors, steering arrays and vidicon cameras.

Figure 4:
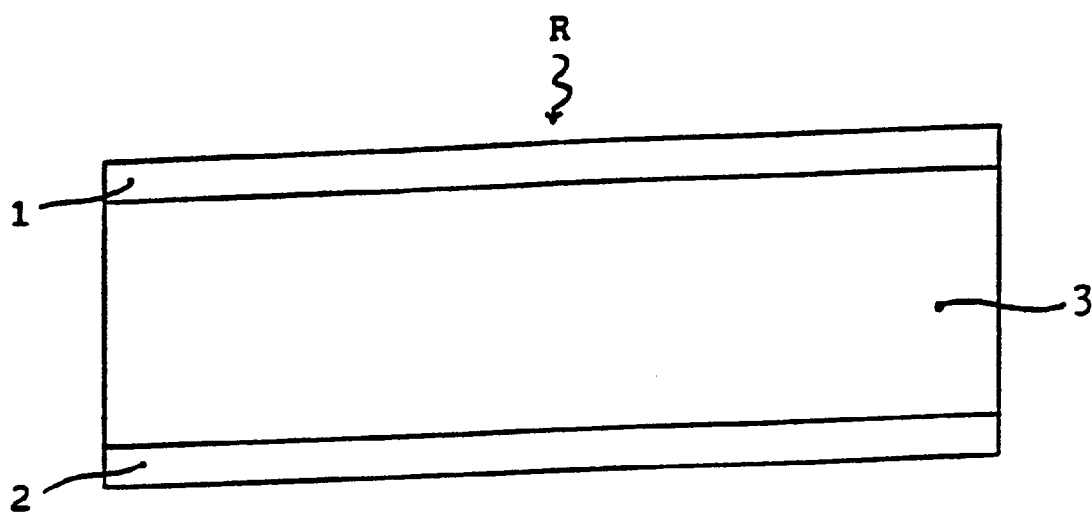
FIG. 4 illustrates a pyroelectric device.

FIG. 4 illustrates a simple pyroelectric detector in which the materials of the present invention may be incorporated.

A pyroelectric detector consists of electrode plates 1,2 at least one of which may be pixellated. In operation the detector is exposed to radiation R, for example infrared radiation, which is absorbed by the electrode 1. This results in a rise in temperature which is transmitted to a layer of pyroelectric material 3 by conduction, The change in temperature results in a thermal expansion and a charge is generated. This change in charge is usually small when compared with the charge output due to the change in the spontaneous polarisation, Ps with a change in temperature. this constitutes the primary pyroelectric effect. A change in charge results in a change in potential difference between the electrodes. The charge on each pixel may be read out and the resulting signal is used to modulate scanning circuits in, for example, a video monitor and for a visual image of the infra red scans.

We claim:

1. A liquid crystal polymer of the formula:

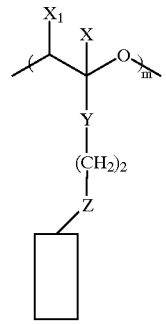

wherein X and $X_1$ are independently selected from straight or branched chain $C_{1-16}$ alkyl, halogen and H;

is any suitable mesogenic group;

Z=single covalent bond, oxygen, $CO_2$ or OCO;

Y is CHOH; n=1–20 and m=3–10,000.

2. A liquid crystal polymer according to claim 1, wherein the mesogenic group is defined from general structure II:

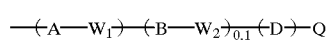

II wherein A, B and D are independently selected from:

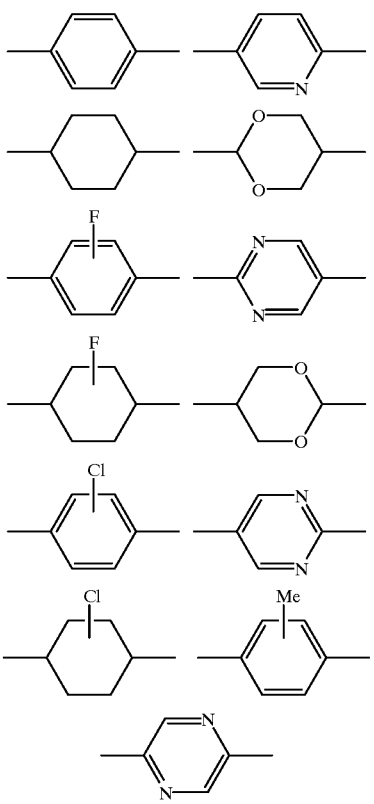

W$_1$ and W$_2$ are independently selected from a single covalent bond, COO, OCO, CH$_2$CH$_2$, CH$_2$O, OCH$_2$, O;

Q is selected from:
CN, halogen, R, OR, COOR, OOCR, CF$_3$ and lactate derivatives, where R may be chiral, straight or branched chain alkyl and may include from 1–16 carbon atoms and including where one or more non-adjacent CH$_2$ groups may be substituted by CH(CN), CH(CF$_3$), CH(Cl), CH(CH$_3$);
the substituents on the phenyl and cyclohexyl rings indicate that at least one substituent may be present on the rings specified and up to four substituents present on the phenyl rings and up to ten substituents present on the cyclohexyl rings.

3. A liquid crystal polymer according to claim 1 wherein the OH groups are used as a point of attachment for cross-linking agents to form elastomers.

4. A liquid crystal material having optically active properties and containing at least one liquid crystal polymer or copolymer as claimed in claim 1.

5. A liquid crystal material according to claim 4 wherein the material is a ferroelectric liquid crystal material.

6. A liquid crystal electro-optical display device characterised in that it includes the material as claimed in either of the claims 4.

7. A device comprising two spaced cell walls each bearing electrode structures and treated on at least one facing surface with an alignment layer, a layer of a liquid crystal material enclosed between the cell walls, characterised in that it incorporates the liquid crystal material as claimed in claim 4.

8. A pyroelectric device comprising two spaced electrodes and a layer of a liquid crystal material enclosed between the electrodes, characterised in that it incorporates the liquid crystal material as claimed in claim 4.

9. An optical recording medium comprising a recording a layer which comprises one or more compounds of claim 1 and a dye material.

* * * * *